April 14, 1925.  1,533,572
R. H. RICHARDS
FURNACE
Filed Oct. 2, 1922   2 Sheets-Sheet 1

Inventor
Robert H. Richards,
By Dodge and Sons
Attorneys

April 14, 1925.
R. H. RICHARDS
FURNACE
Filed Oct. 2, 1922
1,533,572
2 Sheets-Sheet 2
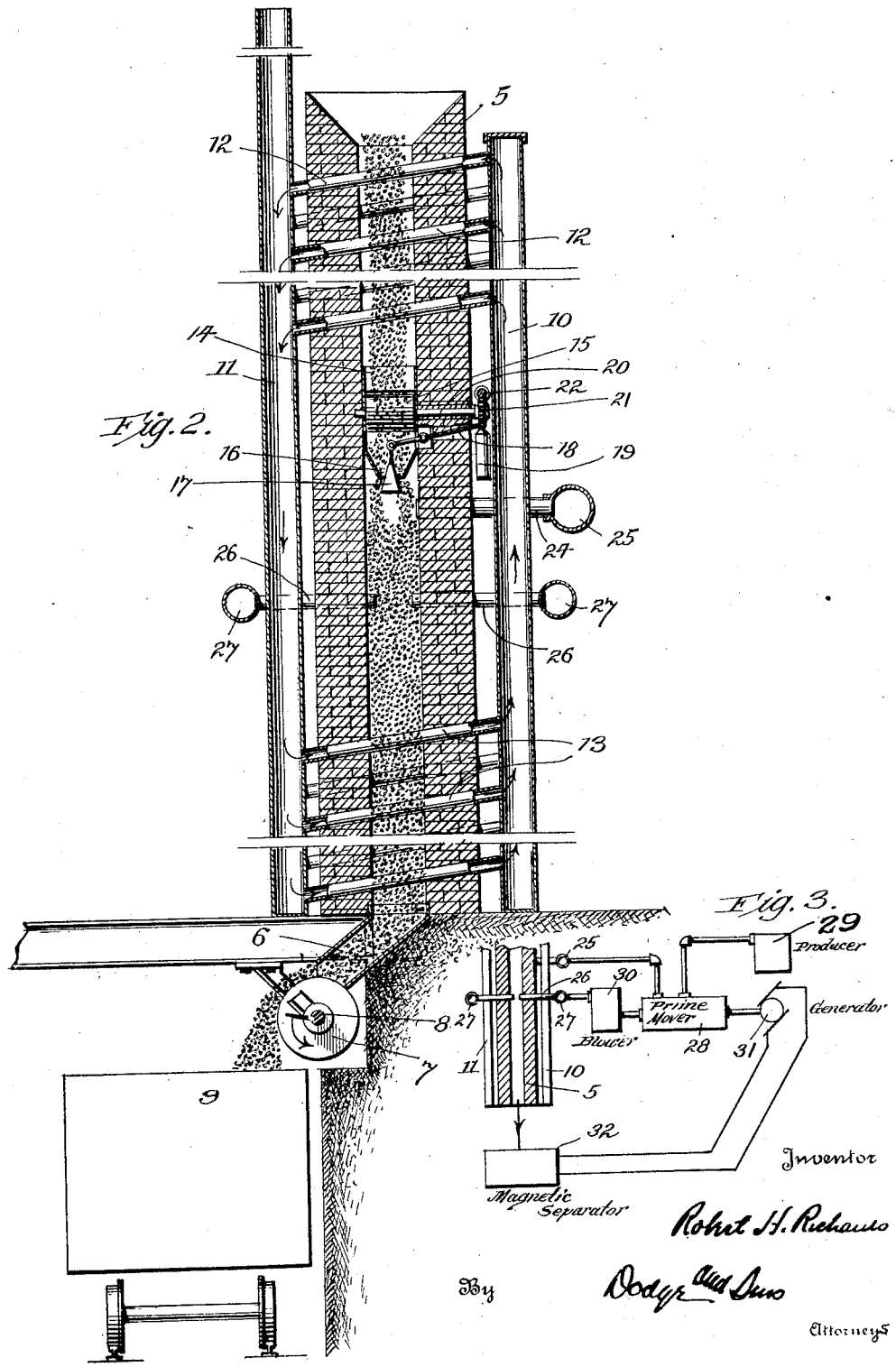

Patented Apr. 14, 1925.

1,533,572

UNITED STATES PATENT OFFICE.

ROBERT H. RICHARDS, OF BOSTON, MASSACHUSETTS.

FURNACE.

Application filed October 2, 1922. Serial No. 591,841.

*To all whom it may concern:*

Be it known that I, ROBERT H. RICHARDS, a citizen of the United States, residing at Boston, in the county of Suffolk and State of Massachusetts, have invented certain new and useful Improvements in Furnaces, of which the following is a specification.

This invention relates to plants for the magnetic separation of ores and particularly to a furnace for performing a magnetizing roast on the ore, said furnace being designed to conserve heat, and to furnish combustible gas to the prime mover which in turn furnishes power for the furnace blast, and the operating current for a magnetic separator. The entire roasting and separating plant form, therefore, a self-sustaining unit operated by the roasting fuel, and subject to minimum heat losses.

Such a plant is illustrated, partly in diagram, in the drawings, in which:—

Fig. 2 is a section on a line 2—2 of Fig. 1.

Fig. 3 is a diagram illustrating the related elements of the roasting and separating plant.

Figure 1:
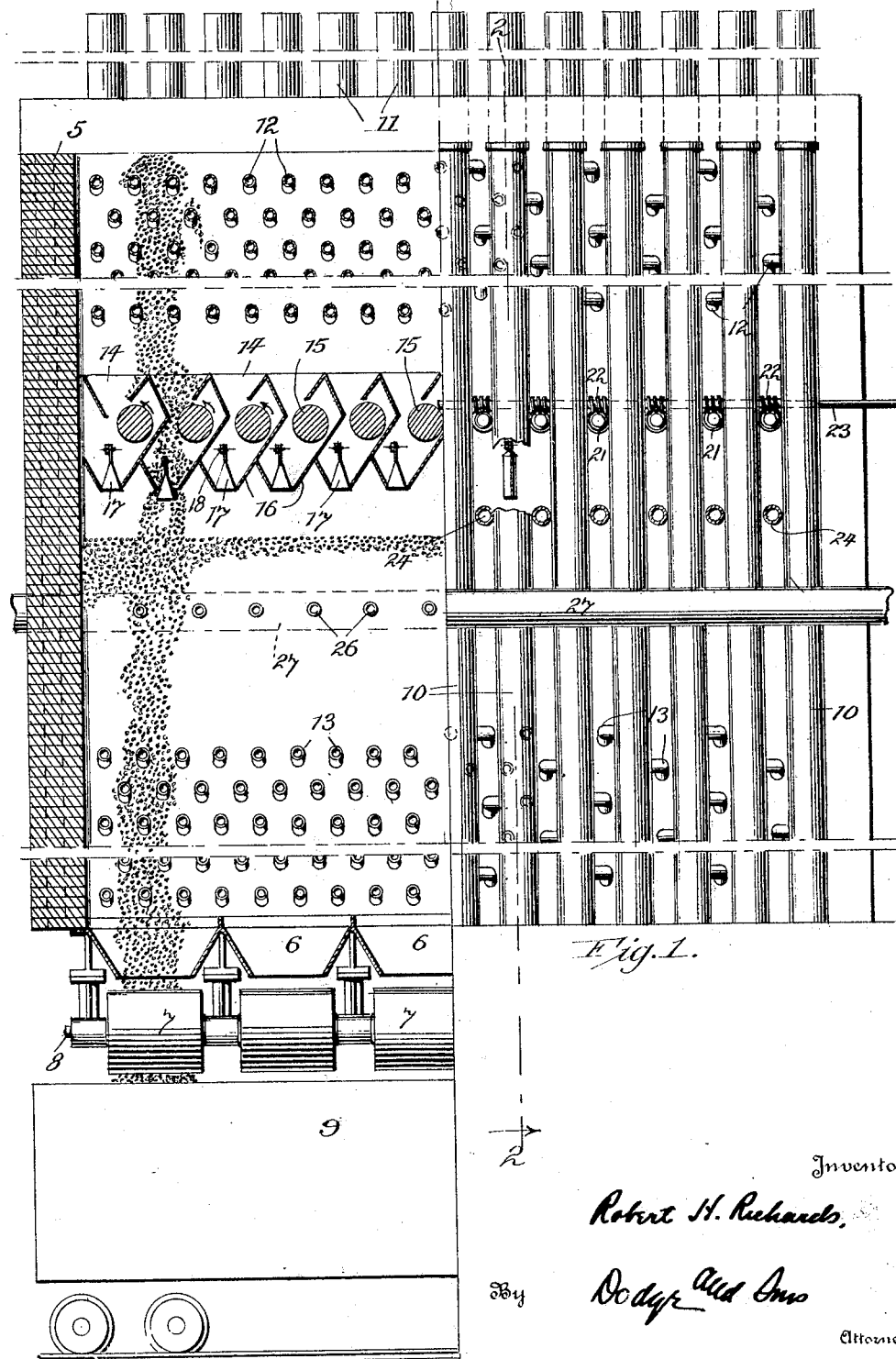
Fig. 1 is a view of the furnace partly in section and partly in elevation. Parts are broken away in this drawing to reduce the height of the figure.

The progress of the magnetizing roast involves, first, drying the ore by heat to eliminate free or combined water, second, partial reduction of the ore to magnetic oxid by the slow combustion of carbonaceous fuel with less air than is necessary for complete combustion, third, cooling of the ore before discharge to a temperature at which reoxidation will not occur.

The furnace is of the shaft type and is designed to abstract heat from the ore in an ore-cooling zone near the bottom and apply such heat usefully to drying and heating the incoming ore and fuel as they pass through the first or drying zone, near the top. This function is performed by convection currents in a liquid circulating system. The reduction of the ore in the middle or reduction zone is only partial and the resulting gaseous products of combustion passing from the furnace are available to be burned in a prime mover plant to generate mechanical power. Part of this power is used to generate electricity to operate the magnetic separator or separators fed by the furnace, and part is used to operate the blowing units which furnish blast to the furnace tuyères and for other purposes such as conveyor drives. Other fuel may be used to supplement the gas supplied by the roasting furnace. Thus the heat carried off by the discharging ore is reduced to a minimum and the furnace gases are usefully applied.

The main structure of the furnace is a vertical shaft 5 of suitable brick work, the height of which is such as to provide an ample heating and drying zone at the top, and a cooling zone near the bottom, with an intervening reduction zone of such length as to permit the desired reduction reactions to occur. These dimensions are subject to some variations according to the particular installation. The proportions of the shaft are such as to cause the ore to descend in a wide and relatively thin mass, the purpose being to reduce the length of the cooling and heating pipes, and to shorten and simplify the feed control mechanism which admits the ore from the drying to the reducing zone.

The shaft 5 is open at its extreme top and ore is fed to it by any suitable conveyor or furnace-charging mechanism, not shown. Ore is discharged from the bottom of the furnace through inclined chutes 6, each of which is partially closed by a corresponding power driven roll 7. These rolls 7 are fast on a common shaft 8 which is driven in any convenient manner. Each roll 7 is so positioned with reference to the corresponding chute 6, and to the angle of repose of discharging ore that unless the rolls be rotated in the direction of the arrow no material will be discharged through the chutes. This construction causes the discharging ore substantially to seal the base of the furnace and permits regulation of the rate of discharge by regulation of the speed of rotation of the rolls. The discharge may be to any suitable means, such as the car 9, for conveying the roasted ore to the magnetic separator.

The heat transferring means which abstracts heat from the discharging ore, and applies that heat to drying the incoming ore, consists of a plurality of isolated units each composed of a pair of risers 10 and 11 connected at the top by a plurality of inclined dryer tubes 12, and connected at the bottom by a plurality of similarly inclined cooling tubes 13. The tubes 12 and 13 of the various units are so arranged as to extend in staggered relation across the entire transverse area and through the entire height of the drying and cooling zones respectively. The purpose of using a plurality of isolated units, each with its own pair of risers, is to limit the effect on the furnace of the failure of individual tubes. The liquid circulating medium which fills the risers 10 and 11 and the tubes 12 and 13 is preferably oil or the like, though water may be used in some cases.

The purpose of inclining the tubes is to intensify the convection currents in the system. The riser 10 is closed at its top, the riser 11 is extended above the top of the furnace, and is open to the atmosphere to offer expansion space to the circulating liquid. The risers 11 through which the circulating liquid descends are preferably left bare so as to radiate heat to the atmosphere. The risers 10 can advantageously be lagged. While a thermo siphon circulating system is preferred because of its simplicity, any other known means for causing the desired circulation might be substituted.

Immediately below the lowermost row of tubes 12 there is mounted a feed mechanism which performs the double function of controlling the rate of feed from the drying zone above the feed mechanism to the reduction zone immediately below it, and of preventing the escape of products of combustion in any substantial quantity from the reduction zone through the drying zone.

Any suitable mechanism for this purpose might be used, but I prefer a construction in which a horizontal series of top hoppers 14 feed the ore to a series of power driven rolls 15, which turn in the mouths of the hoppers and control the discharge therethrough. Immediately below each hopper 14 is a second and corresponding hopper 16 whose mouth is closed by a bell or valve 17 mounted on a rock lever 18 which carries a counterweight 19. Each bell 17 with its lever 18 and counterweight 19 operates independently of the others.

The counterweight tends to hold the bell closed until the hopper fills, whereupon the weight of material forces the bell down, allowing substantially all of the material to escape from the hopper 16, whereupon the bell again rises and remains in its closed position until the drum 15, immediately above it, has fed enough material to the corresponding hopper 16 to cause the bell 17 again to open. Consequently the bells 17 are closed most of the time and prevent escape of gas through the top of the furnace shaft.

The rolls 15 are mounted on shafts 20 which extend outward through the side of the furnace. Each shaft 20 is provided with a worm wheel 21. The worm wheels are driven by corresponding worms 22, which are mounted on a common shaft 23, driven at proper speed in any convenient manner.

Immediately below the hoppers 16 are a series of off-take pipes 24 connected to a common manifold 25. Below the pipes 24 and some distance above the top-most cooling pipe 13 are two rows of blast tuyères 26 which are fed by the blast pipes 27.

The general relation of the furnace just described to the entire plant is indicated in diagram in Fig. 3. Gas drawn from the manifold 25 is fed to any suitable prime mover 28, in which it may be burned and generate mechanical power. This plant may be a steam boiler and engine or an internal combustion engine, and the plant should include such washers and scrubbers as are necessary to purify the gas. In case the amount of gas is insufficient for the requirements the deficiency may be made up in any suitable way by the use of other fuel. As an example I illustrate a stand-by gas producer 29. The prime mover drives a blower 30 of any suitable type which furnishes blast to the tuyères 26 through the blast pipe 27. The prime mover also drives a generator 31 which furnishes current to the electric separator 32, and for other auxiliary purposes, such as motors (not shown) connected to drive the rolls 7 and 15, and such conveying mechanism as the plant requires.

In the operation of the furnace, ore mixed with a suitable fuel, such as coke or coal is fed into the top of the furnace at a proper rate. It fills the top of the shaft down to the hoppers 14 and as it flows down over the pipes 12 it is dried and heated. The relative rates of feed of the rolls 15 and 7 are properly correlated with the result that the ore is maintained in a continuous bed from the base of the shaft to a point just below the off-take pipe 24. The fuel entering with the ore is ignited by the heat from the charge beneath. The ore descending through the zone between the off-take pipes 24 and the tuyères 27 is subjected to a reducing action incident to the combustion of the carbonaceous fuel mixed therewith under the blast from the tuyères. The space between the tuyères 26 and the topmost tubes 13 is an even more effective reducing zone for here the ore is in contact with incandescent fuel and no air is being supplied. As the hot ore descends around the tubes 13 the liquid circulating through these tubes abstracts its heat and conveys it to the drying tubes 12, where it dries and heats the incoming charge. By this means the ore finally discharged over the rolls 7 is cooled to such a temperature that reoxidation will not occur. This discharged ore is then subjected to the magnetic separation process, to which treatment it is adapted as a result of the magnetizing or deoxidizing roast to which it is subjected in the furnace.

As already stated, the electric power for operating these separators as well as power for auxiliaries of the furnace is generated by the use of the off-take gases from the furnace.

What is claimed is:—

1. In an ore roasting furnace, the combination of a furnace shaft providing in order a drying zone, an ignition zone, a reducing zone and a cooling zone; a tubular heat-radiating structure in the drying zone; a tubular heat-abstracting structure in the cooling zone; means for passing a heat conveying fluid in a closed circuit through said heat-radiating and heat-abstracting structures; tuyères and off-takes for said reducing zone; and means for feeding a mixture of ore and fuel at a controlled rate through said zones in order, the fuel being burned in contact with the ore in said reducing zone.

2. In an ore roasting furnace, the combination of a furnace shaft providing in order a drying zone, an ignition zone, a reducing zone and a cooling zone; a tubular heat-radiating structure in the drying zone; a tubular heat-abstracting structure in the cooling zone; means for passing a heat conveying fluid in a closed circuit through said heat-radiating and heat-abstracting structures; means for abstracting heat from said fluid as it passes from the heat-radiating to the heat-abstracting structure; tuyères and off-takes for said reducing zone; and means for feeding a mixture of ore and fuel at a controlled rate through said zones in order, the fuel being burned in contact with the ore in said reducing zone.

3. In an ore roasting furnace, the combination of a furnace shaft providing in order a drying zone, a reducing zone, and a cooling zone; a tubular heat-radiating structure in the drying zone; a tubular heat-abstracting structure in the cooling zone; means for passing a heat conveying fluid in a circuit through said heat-radiating and heat-abstracting structures; tuyères and off-takes for said reducing zone; means for feeding mixed ore and fuel at a controlled rate from the drying to the reducing zone, said fuel being burned in said reducing zone; and means serving to close said shaft against the passage of gas from the reducing zone to the drying zone.

4. In an ore roasting furnace, the combination of a furnace shaft providing in order a drying zone, a reducing zone, and a cooling zone; a tubular heat-radiating structure in the drying zone; a tubular heat-abstracting structure in the cooling zone; means for passing a heat conveying fluid in a circuit through said heat-radiating and heat-abstracting structures; tuyères and off-takes for said reducing zone; means for feeding mixed ore and fuel at a controlled rate from the drying to the reducing zone, said fuel being burned in said reducing zone; means serving to close said shaft against the passage of gas from the reducing zone to the drying zone; and means for discharging ore from said cooling zone at a controlled rate.

5. The combination in an ore roasting furnace, of means serving to abstract heat from the roasted ore prior to discharge thereof from the furnace; a drying device in the path of ore entering the furnace said drying device applying the heat so abstracted directly to the drying of the entering charge; and blast tuyères and combustion product off-takes arranged to operate independently of said drying and heat abstracting means.

6. The combination with an ore roasting furnace in which fuel is burned in contact with the ore, and a magnetic separator fed by roasted ore from said furnace; of a blower for furnishing blast to said furnace; a dynamo electric machine for furnishing electric current to said separator; and a prime mover operated by waste gases from said furnace and connected in driving relation with said blower and generator.

In testimony whereof I have signed my name to this specification.

ROBERT H. RICHARDS.